Patented May 9, 1950

2,506,975

UNITED STATES PATENT OFFICE 2,506,975

SYNTHESIS OF CYSTATHIONINE AND INTERMEDIATE CONDENSATION PRODUCTS

Jakob A. Stekol, Glenside, Pa., assignor to The Lankenau Hospital, Philadelphia, Pa., a corporation of Pennsylvania No Drawing. Original application February 16, 1948, Serial No. 8,743. Divided and this application September 3, 1949, Serial No. 114,064

5 Claims. (Cl. 260—268)

This invention relates to a process of synthesizing cystathionine and to a new condensation product of cysteine and dichloroethyldiketopiperazine.

The synthesis of cystathionine hereafter described is based on the condensation of cysteine with dichloroethyldikeptopiperazine in liquid ammonia followed by the acid hydrolysis of the condensation products, which are new and useful of themselves, to yield cystathionine. While a specific example is set forth below, it will be understood by those skilled in the art that variations may be employed within the general scope of the process involved.

EXAMPLE

Synthesis of cystathionine 10 grams of metallic sodium were dissolved in 500 ml. of liquid ammonia and 24 grams of L-cystine were added to the solution in small portions with constant agitation of the reaction mixture. The blue color of the excess sodium was discharged by a few crystals of L-cystine. 24 grams of 3,6-bis ($\beta$-chloroethyl)-2,5-diketopiperazine were then added to the cysteine thus formed in the reaction vessel in small portions with thorough mixing of the solution. After all the diketopiperazine derivative had been added, the ammonia was allowed to evaporate, and the reaction vessel was evacuated in order to remove as much ammonia as possible from the residue. The latter was then dissolved in about 300 ml. of ice cold water and the solution was filtered through a bed of decolorizing carbon. The filtrate was adjusted with hydrochloric acid to about pH 9, and about 3 grams of sodium cyanide were added to the solution in order to convert any unreacted cystine to the soluble form. After 10 to 15 minutes the pH of the solution was adjusted under a hood with hydrochloric acid to 6.0. After standing in a refrigerator overnight, the precipitated material was removed by filtration, washed with cold water, then recrystallized from a dilute ammoniacal solution by addition of hydrochloric acid to pH 6.0. The crystallized product was suspended in water, removed by filtration, and washed successively with water, ethanol, and ether. After drying in vacuo at 100° C. over $P_2O_5$, the product decomposed at 260–265° C. The compound gave a negative sodium cyanide-nitroprusside test. The ninhydrin test was positive. The diketopiperazine derivative, 3,6-bis (S-($\beta$-amino, $\beta$-carboxyethyl)-ethyl)-2,5-diketopiperazine, thus produced gave a negative sodium cyanide-nitroprusside test and the ninhydrin test was positve.

10 grams of the diketopiperazine derivative prepared as described above were hydrolyzed by refluxing with 150 ml. of 20 per cent hydrochloric acid for 3 hours. The solution was then evaporated in vacuo to dryness on a steam bath, and the residue was dissolved in 50 ml. of water. Only a slight darkening of the solution of the diketopiperazine derivative in hydrochloric acid resulted after 3 hours of refluxing. The solution was then decolorized and filtered. The filtrate was adjusted with dilute sodium hydroxide to pH 6.0 and cooled in an ice-bath. Crystallization may be speeded up by the addition of ethanol (to about 40 per cent concentration with respect to ethanol). After standing in a refrigerator overnight, the crystallized material was removed by filtration and washed with cold water. After recrystallization from dilute ethanol and drying in vacuo at 100° C. over $P_2O_5$, the product weighed 10 grams, or 90 per cent of the theoretical amount. It decomposed at 270–274° C. The sodium cyanide-nitroprusside test on the material was negative. The analytical results are shown below.

|  | C | H | N | S |
|---|---|---|---|---|
| Found | 37.01 | 6.47 | 12.60 | 14.18 |
| Calc. for $C_7H_{14}N_2SO_4$ | 37.38 | 6.36 | 12.61 | 14.41 |

The resulting product, namely, S-($\beta$-amino, $\beta$-carboxyethyl)-homocysteine, is referred to in the present specification and in the appended claims as cystathionine.

The reaction of the example is represented by the following:

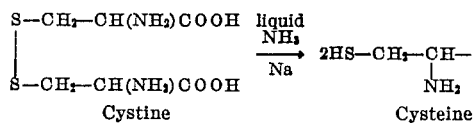
Cystine

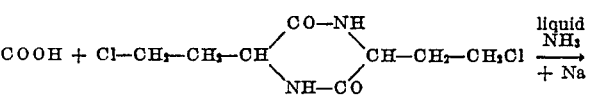
Cysteine

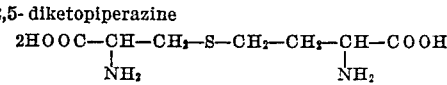
3,6-bis(β-chloroethyl)-2,5-diketopiperazine

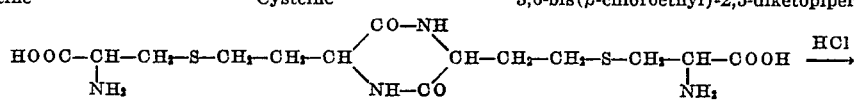
3,6-bis(S-(β-amino, β-carboxyethyl)-ethyl)-2,5-diketopiperazine $$2HOOC-CH-CH_2-S-CH_2-CH_2-CH-COOH$$
$$\qquad\quad NH_2 \qquad\qquad\qquad\qquad NH_2$$
Cystathionine While the use of hydrochloric acid is specified in the above example for carrying out the acid hydrolysis step it will be understood by those skilled in the chemical art that other well-known hydrolyzing compounds may be employed. It will likewise be apparent that other homologues of cystathionine may be prepared by means of the dichloroethyldiketopiperazine condensation reaction of the present invention followed by the hydrolysis of the condensation product. Where other homologues of cystathionine are desired the process is carried out using the appropriate homologue of cystine as a starting point. It will also be apparent that various isomers of the starting materials may be used.

This application is a division of my prior application for Letters Patent filed under date of February 16, 1948 and bearing Serial No. 8,743.

Having thus described my invention, I claim:

1. The method of preparing S-(β-amino, β-carboxyethyl) - homocysteine which comprises condensing cysteine with dichloroethyldiketopiperazine to form the intermediate 3,6-bis (S-(β-amino, β-carboxyethyl)-ethyl) - 2,5 - diketopiperazine and subjecting the said intermediate to hydrolysis, the hydrolysis reaction being carried out so as to produce the said S-(β-amino, β-carboxyethyl)-homocysteine.

2. The invention of claim 1 further characterized by the fact that the hydrolysis of the intermediate is carried out by refluxing with hydrochloric acid.

3. As a new chemical compound 3,6-bis (S-(β-amino, β-carboxyethyl)-ethyl)-2,5-diketopiperazine.

4. The method of preparing 3,6-bis (S-(β-amino, β-carboxyethyl)-ethyl)-2,5-diketopiperazine which comprises condensing cysteine with diketopiperazine.

5. The method of preparing S-(β-amino, β-carboxyethyl)-homocysteine which comprises hydrolyzing 3,6-bis (S-(amino, carboxyethyl)-ethyl)-2,5-diketopiperazine, the reaction being carried out so as to produce said S-(β-amino, β-carboxyethyl)-homocysteine.

JAKOB A. STEKOL.

No references cited.